United States Patent Office 3,481,814
Patented Dec. 2, 1969

3,481,814
METHOD FOR ADHESIVELY BONDING HEAVY METALS
Ival O. Salyer, Dayton, and David Gerald Glasgow, Centerville, Ohio, assignors, by mesne assignments, to the United States of America as represented by the United States Atomic Energy Commission
No Drawing. Filed Aug. 8, 1966, Ser. No. 570,759
Int. Cl. C09j 5/06; B32b 15/00
U.S. Cl. 156—314                                        10 Claims

---

ABSTRACT OF THE DISCLOSURE

A method for bonding heavy metal surfaces including priming the surfaces with an epoxyalkanoic acid or an epoxyalkanol-phosphoric acid ester than coating with an epoxy adhesive and curing.

---

The invention described herein was made in the course of, or under, a contract with the United States Atomic Energy Commission.

This invention relates to the modification of metal surfaces, and more particularly provides a new and valuable method for bonding metal surfaces together.

The art of bonding metal surfaces together with an epoxy adhesive is well known. For example, see Adhesive Materials, by Irving Katz, Foster Publishing Co., Long Beach, Calif., 1964, pp 50–51. However, the bond between the metal surfaces is weakened when the surface of the metal has been tarnished and/or corroded. The metal surfaces should, therefore, be substantially clean. The necessity for cleanliness poses a particularly difficult problem in the case of those metals which are easily oxidized or otherwise tarnished upon exposure to air.

Generally, readily oxidizable metals can be protected by painting them; but in many instances, painted surfaces prevent utilization of the metal for the purposes for which it is intended. Strong bonding between such painted surfaces is not readily obtainable.

Accordingly, an object of this invention is to render metal surfaces conducive to the formation of strong bonding between said surfaces and an epoxy adhesive. Another object is the method of bonding together the surfaces of readily oxidizable and tranishable metals wherein the surface of said metal is protected from corrosion, while at the same time it is rendered reactive for the adhesive.

These and other objects hereinafter disclosed are provided according to the invention by the process of bonding together two substantially clean metal surfaces of a metal whose surface is attacked upon exposure to the atmosphere, which process comprises (A) treating the surfaces with an epoxy compound selected from the class of (I) an epoxy-alkanoic acid of from 8 to 20 carbon atoms and (II) an ester of phosphoric acid and an epoxyalkanol of from 3 to 6 carbon atoms, (B) positioning between the treated surfaces an epoxy adhesive, including a curing agent therefor, so as to contact each surface and (C) maintaining the contact while allowing the adhesive to cure.

As epoxy adhesives any of those which are disclosed in High Polymers, vol. X, "Polymer Processes," Interscience Publishers, Inc., N.Y. (1956), chapter X, may be used. These adhesives are condensation products formed by the reaction of a polyhydroxy compound and epichlorohydrin, which condensation products are subsequently cured by addition of cross-linking agents. Examples of the polyhydroxy compounds are ethylene glycol, diethylene glycol, propylene glycol, trimethylene glycol, trimethylolpropane, trimethylolethane, 1,4-butanediol, 4,4'-isopropylidenediphenol, 4,4'-(2-butylidene)-di-m-cresol, glycerol, pentaerythritol, mannitol, etc. Bisphenol, i.e., 4,4'-isopropylidenediphenol is commonly employed. The cross-linking agent employed in the curing or hardening step may be a dicarboxylic compound such as phthalic anhydride or adipic acid, but is more generally a polyamine such as ethylene diamine, m- or p-phenylene diamine or, diethylenetriamine.

According to this invention, before applying the epoxy adhesive, the metal is treated with an epoxy compound which may be either a higher epoxyalkanoic acid or an ester of phosphoric acid and a lower epoxyalkanol. Examples of the useful epoxyalkanoic acid are 7,8-epoxyoctanoic acid, 6,7-epoxyoctanoic acid, 5,6-epoxyoctanoic acid, 8,9-epoxynonanoic acid, 7,8-epoxynonanoic acid, 6,7-epoxynonanoic acid, 5,6-epoxynonanoic acid, 9,10-epoxydecanoic acid, 8,9-epoxydecanoic acid, 7,8-epoxydecanoic acid, 6,7-epoxydecanoic acid, 5,6-epoxydecanoic acid, 10,11-epoxyundecanoic acid, 9,10-epoxyundecanoic acid, 8,9-epoxyundecanoic acid, 7,8-epoxyundecanoic acid, 11,12-epoxydodecanoic acid, 9,10-epoxydodecanoic acid, 7,8-epoxydodecanoic acid, 12,13-epoxytridecanoic acid, 11,12-epoxytridecanoic acid, 10,11-epoxytridecanoic acid, 13,14-epoxytetradecanoic acid, 10,11-epoxytetradecanoic acid, 8,9-epoxytetradecanoic acid, 14,15-epoxypentadecanoic acid, 13,14-epoxypentadecanoic acid, 12,13-epoxypentadecanoic acid, 9,10-epoxypentadecanoic acid, 15,16-epoxyhexadecanoic acid, 13,14-epoxyhexadecanoic acid, 9,10-epoxyhexadecanoic acid, 16,17-epoxyheptadecanoic acid, 15,16-epoxyheptadecanoic acid, 13,14-epoxyheptadecanoic acid, 9,10-epoxyheptadecanoic acid, 17,18-epoxyoctadecanoic acid, 16,17-epoxyoctadecanoic acid, 18,19-epoxynonadecanoic acid, 17,18-epoxynonadecanoic acid, 15,16-epoxynonadecanoic acid, 19,20-epoxyeicosanoic acid, 18,19-epoxyeicosanoic acid, 17,18-epoxyeicosanoic acid, etc. Examples of the useful esters of phosphoric acid and epoxyalkanols are 2,3-epoxypropyl phosphate, 2,3-epoxybutyl phosphate, 3,4-epoxybutyl phosphate, 2,3-epoxypentyl phosphate, 3,4-epoxypentyl phosphate, 4,5-epoxypentyl phosphate, 2,3-epoxyhexyl phosphate, 3,4-epoxyhexyl phosphate, 4,5-epoxyhexyl phosphate, 5,6-epoxyhexyl phosphate, bis(2,3-epoxypropyl) phosphate, bis(2,3-epoxybutyl) phosphate, bis(3,4-epoxybutyl) phosphate, bis(2,3-epoxypentyl) phosphate, bis(3,4-epoxypentyl) phosphate, bis(4,5-epoxypentyl) phosphate, bis(2,3-epoxyhexyl) phosphate, bis(3,4-epoxyhexyl) phosphate, bis(4,5-epoxyhexyl) phosphate, bis(5,6-epoxyhexyl) phosphate, tris(2,3-epoxypropyl) phosphate, tris(3,4-epoxybutyl) phosphate, tris(4,5-epoxypentyl) phosphate, tris(5,6-epoxyhexyl) phosphate, etc.

The aforementioned epoxy acids or epoxy phosphates are deposited on the metal surfaces in mono- or multilayers, depending on the method used. Although the mechanism by which these agents operate has not been proved, it is believed that one functional group of the aforementioned compounds reacts with or coordinates to the metal surface to provide an impermeable layer. The second functional group then reacts with an adhesive or provides a surface capable of being wet by an adhesive, i.e., a high-energy surface. In this manner, a continuous, strong bond between the adhesive and the metal surface is formed.

In order for the epoxy acid or epoxy phosphate to react with or coordinate to the metal surface, the metal surface must be substantially clean. This may be accomplished by pickling the metal in an acid bath, or electropolishing. Care should be taken to avoid tarnishing or corrosion of the metal surface before said epoxy compound is applied. This requires treatment by the expoxy compound immediately after cleaning. Such necessity for correct timing may be avoided by combining the cleaning operation and the application of the cross-linking agent into one step. For example, the epoxy compound may be dissolved in an inert liquid carrier and a 50% nitric acid bath. Owing to the high receptivity of the freshly cleaned metal surface which results upon immersion into the nitric acid-containing bath, the epoxy compound, which is also present in the same bath, becomes firmly bound to the metal surface while the metal is immersed in the bath. The metal is removed from its bath in any manner which is customarily employed for the removal of solid objects from liquids in which they have been immersed, e.g., the metal may be taken out, with forceps, or the bath liquor may be decanted from the metal. For continuous operation, the content of epoxy compound in the bath should be replenished as it is depleted by deposition on the metal surface.

When it is inconvenient to use the epoxy acid or epoxy phosphate only in an amount which is soluble in the mixture of nitric acid and carrier, or to maintain a constant concentration thereof within the bath, there may be used a quantity of the said epoxy compound which exceeds the limit of its solubility in said mixture. In that case, the excess will form a film upon the surface of the bath, which film will diminish in thickness as the dissolved epoxy compound is depleted. However, both from the standpoint of disregarding the solubility limit of the compound and assurance of complete contact of the metal, it is convenient to operate by drawing the metal from the bath through a surface film of the compound. Since deposition and/or reaction of the epoxy compound with the metal surface takes place while the metal is immersed in the bath, no precautions have to be observed in removing the metal, even though its removal requires penetration of the surface film. Pulling through the surface film will only cause additional, though often unnecessary, build-up of layers of the epoxy compound upon the metal surface. The deposit of the epoxy compound upon the metal surface, while it has been immersed in the bath, is extremely adherent; hence, there is little, if any, risk of peeling as a consequence of too rapid a withdrawal.

The time required for deposition and/or reaction of the epoxy compound upon or with the metal surface will vary with the cleanliness of the metal surface, the concentration of nitric acid, and the nature and concentration of the epoxy compound. A badly tarnished metal surface will require a longer pickling or cleaning time than will a surface which has been recently cleaned. Hence, the metal should be immersed in the bath for a time sufficient to assure thorough cleaning of the surface. Deposition of the epoxy compound on the cleaned surface occurs almost immediately, so that multi-layers rather than a mono-layer, of the compound upon the metal surface are generally obtained within a few minutes or even seconds. Ordinarily, even with old, badly tarnished or corroded metal surfaces a sojourn time of from, say, 5 to 20 minutes is sufficient both to clean the surface and deposit the epoxy compound upon it. Manipulation of the metal while in the bath is unnecessary, although, in order to expose all surfaces to the bath liquors within the shortest time, it may be found desirable to suspend the metal as in electroplating or to turn it over should it be merely supported by the base of the container.

After treatment with the aforementioned epoxy compound, the adhesive is applied, using, say, a spatula or other convenient means to form, e.g., lap or butt joints. Pressure may or may not be used to produce a good joint, depending upon other factors, such as heat, humidity, and the type of adhesive used.

Although the present invention is applicable to the bonding of metals generally, it is especially useful with those metals which tarnish or otherwise deteriorate upon exposure to the atmosphere. Such metals are herein referred to as metals whose surfaces are attacked upon exposure to the atmosphere, and broadly include the metals of Groups VI–B, VII–B, VIII–B and the Actinide Series of the Periodic Arrangement of Elements. Owing to both their economic importance and their high reactivity with oxygen, the presently provided bonding method is most advantageously employed with a heavy metal selected from the class consisting of iron, copper, tungsten, silver, tin, uranium and thorium. However, in order to present comparable results with respect to the efficacy of the various epoxy compounds, the detailed description which follows is limited to uranium because this metal is extremely susceptible to attack by oxygen.

The invention is further illustrated by, but not limited to, the following examples.

EXAMPLE 1

Uranium plates 1″ x 4½″ x ⅛″ were pickled in a 50% nitric acid solution. The plates were rinsed in acetone and air dried for five minutes. The uranium plates were then placed in a square dish and 410 ml. of a 50% nitric acid solution was poured into the dish. A solution containing 1 g. of 10,11-epoxyundecanoic acid in 10 ml. of purified acetone was poured into the dish containing the uranium plates. The 10,11-epoxyundecanoic separated and formed a film top of the nitric acid solution. Forceps were used to pull the uranium plates through the film. The plates were next washed in acetone and air dried. An adhesive, consisting of 6 g. of an epoxy resin, made from Bisphenol-A and epichlorohydrin, and 4 g. of an amine-terminated polyamide was subsequently applied using a spatula, and ¾″ of the end of one plate was covered. A second plate was placed on top of the first using a ½′ overlap, and the lap joint then placed in a press under approximately 50 p.s.i. at room temperature. The resulting assembly was stored overnight in the press, removed from the press, and stored for 18 days at 60° C. and 80% humidity. The tensile shear strength of the resulting well-bonded unit was determined to be 2680 p.s.i.

EXAMPLE 2

Uranium plates, 4½″ x 1″ x 1″ were pickled in a 50% nitric acid solution and rinsed in distilled water for 30 seconds. They were then rinsed in acetone to remove as much water as possible. The uranium plates were immediately dipped in a 25 ml. acetone solution containing 5 g. of 9,10-epoxystearic acid, removed and dried. Subsequently, the epoxy adhesive of Example 1 was applied to form a lap joint as described in Example 1. The resulting assembly was cured at 105±5° C. and approximately 100 p.s.i. for 1¼ hours. After one day of storage at 22° C. and 40% humidity, the tensile shear strength was 2227 p.s.i.

For purposes of comparison, epoxytetrahydrophthalic anhydride was used instead of the epoxystearic acid, using substantially the above procedure. After storing triplicate test specimens for 3 days at 22° C. and 40% humidity, tensile shear strengths of 579 p.s.i., 672 p.s.i. and 835 p.s.i. were determined.

EXAMPLE 3

Uranium plates 4½″ x 1″ x ⅛″ were cleaned in a 50% nitric acid solution, rinsed briefly in distilled water, and followed by a 5 minute acetone rinse. The plates were then dipped into a solution of 5 g. of crude tris(2,3-epoxypropyl)phosphate in 100 ml. of acetone for 10 minutes. After the acetone had evaporated, the adhesive, consisting of 5 g. of an epoxy resin made from Bisphenol-A and epichlorohydrin and 5 g. of an amine-terminated polyamide, was applied using a spatula, and ¾″ of the end of one plate was covered. A second plate was placed on top of the first using a ½″ overlap, and the lap joint then placed in a press under approximately 100 p.s.i. and 100–110° C. for 1¼ hours. After storage for one day at 22° C. and 40% humidity, a tensile shear strength of 3326 p.s.i. was determined.

For purposes of comparison, bonding was conducted without employing the tris(2,3-epoxypropyl)phosphate. The following procedure was used. Uranium plates, 7″ x 1″ x ⅛″ were pickled in a 50% nitric acid solution, rinsed in absolute methanol, and then rinsed in dry ethyl ether. Immediately after drying, an adhesive, consisting of 12 g. of an epoxy resin made from Bisphenol-A and epichlorohydrin and 8 g. of an amine-terminated polyamide, was applied using a spatula, and ¾" of one end of one bar was covered. After 15 minutes the pieces were assembled under similar conditions of the preceding example. The samples were stored at room temperature (22° C.) and in open air for 7 days. The tensile shear strength of the samples was 800 p.s.i. and 612 p.s.i.

The concentration of epoxy compound may be from .02% to 20%. The lower concentration of the epoxy compound is used with the nitric acid bath, e.g., from .02% to 5%. The higher concentration of the cross-linking agent is generally used in an inert carrier.

What we claim is:

1. The process of bonding together two substantially clean surfaces of heavy metals which comprises (A) priming the surfaces with an epoxy compound selected from the class of (I) an epoxyalkanoic acid of from 8 to 20 carbon atoms and (II) an ester of phosphoric acid and an epoxyalkanol of from 3 to 6 carbon atoms, (B) positioning between the primed surfaces an epoxy adhesive, including a curing agent therefor, so as to contact each surface and (C) maintaining the contact while allowing the adhesive to cure.

2. The method defined in claim 1, further limited in that the epoxy compound is an epoxyalkanoic acid.

3. The method defined in claim 1, further limited in that the epoxy compound is an ester of phosphoric acid and an epoxyalkanol.

4. The method defined in claim 1, further limited in that the epoxyalkanoic acid is 10,11-epoxyundecanoic acid.

5. The method defined in claim 1, further limited in that the epoxyalkanoic acid is 9,10-epoxystearic acid.

6. The method defined in claim 1, further limited in that the ester of phosphoric acid and an epoxyalkanol is tris(2,3-epoxypropyl)phosphate.

7. The method defined in claim 1, further limited in that the metal is selected from the class consisting of iron, copper, tungsten, silver, tin, uranium and thorium.

8. The method defined in claim 1, further limited in that the metal is uranium.

9. The method defined in claim 1, further limited in that the adhesive is an epoxy resin made from Bisphenol-A and epichlorohydrin and an amine-terminated polyamide.

10. The method defined in claim 1, further limited in that the epoxy compound is 10,11-epoxyundecanoic acid; the adhesive is an epoxy resin made from Bisphenol-A and epichlorohydrin and an amine-terminated polyamide, and the metal is uranium.

References Cited

UNITED STATES PATENTS

| | | | |
|---|---|---|---|
| 3,075,871 | 1/1963 | Barlet | 156—330 |
| 3,272,647 | 9/1966 | Swanson et al. | 117—75 |
| 3,388,036 | 6/1968 | Alampi | 161—215 |
| 3,411,923 | 11/1968 | Bretz | 117—127 |

HAROLD ANSHER, Primary Examiner

W. E. HOAG, Assistant Examiner

U.S. Cl. X.R.

117—49, 75, 127, 134; 156—330, 331; 161—186